United States Patent [19]

Ronning

[11] 4,287,013
[45] Sep. 1, 1981

[54] COMFORMABLE, MULTILAYERED TAPE ADHERENT ON ONE SURFACE TO FUSABLE METAL ALLOYS AND ON THE OTHER SURFACE TO OPHTHALMIC LENS BLANKS

[75] Inventor: Albert J. Ronning, North Oaks, Minn.

[73] Assignee: Minnesota Mining & Manufacturing Company, Saint Paul, Minn.

[21] Appl. No.: 145,588

[22] Filed: May 1, 1980

Related U.S. Application Data

[63] Continuation-in-part of Ser. No. 36,878, May 8, 1979, abandoned.

[51] Int. Cl.³ .................. B32B 31/00; B32B 33/00; C09J 7/02
[52] U.S. Cl. .................. 156/242; 51/277; 428/352; 428/354; 428/355; 428/356
[58] Field of Search ............. 428/352, 354, 355, 356; 427/207 B; 51/277; 156/242

[56] References Cited

U.S. PATENT DOCUMENTS

| | | | |
|---|---|---|---|
| 2,292,024 | 8/1942 | Dreher | 428/354 |
| 2,913,355 | 11/1959 | Collins . | |
| 2,982,061 | 5/1961 | Dillon | 51/277 |
| 3,160,549 | 12/1964 | Caldwell et al. | 428/354 |
| 3,277,612 | 10/1966 | Brandt | 51/277 |
| 3,355,342 | 11/1967 | Lanman | 51/277 |
| 3,665,918 | 5/1972 | Lindquist et al. | 428/352 |
| 4,199,645 | 4/1980 | Schwarz et al. | 428/354 |

*Primary Examiner*—James C. Cannon
*Attorney, Agent, or Firm*—Cruzan Alexander; Donald M. Sell; James V. Lilly

[57] ABSTRACT

A conformable, multi-layered tape for bonding fusible metal alloy to ophthalmic lens blanks is provided. The tape comprises a polymeric backing layer, a pressure-sensitive adhesive on one surface of the backing layer, and a non-tacky adhesion-promoting layer on the other surface of said backing layer. The tapes have a 2% secant modulus in the range of about 35 kg/cm² to 20,000 kg/cm², a shear value of at least about 10 minutes, a 180° peel value in the range of about 60 g/cm width to 1400 g/cm width, a percent elongation at break in the range of about 45% to 1000% and a lap shear value of at least about 5 kg/cm². Preferably the tapes also have a tensile strength at 100% elongation in the range of about 0.2 to 4 kg/cm.

25 Claims, 2 Drawing Figures

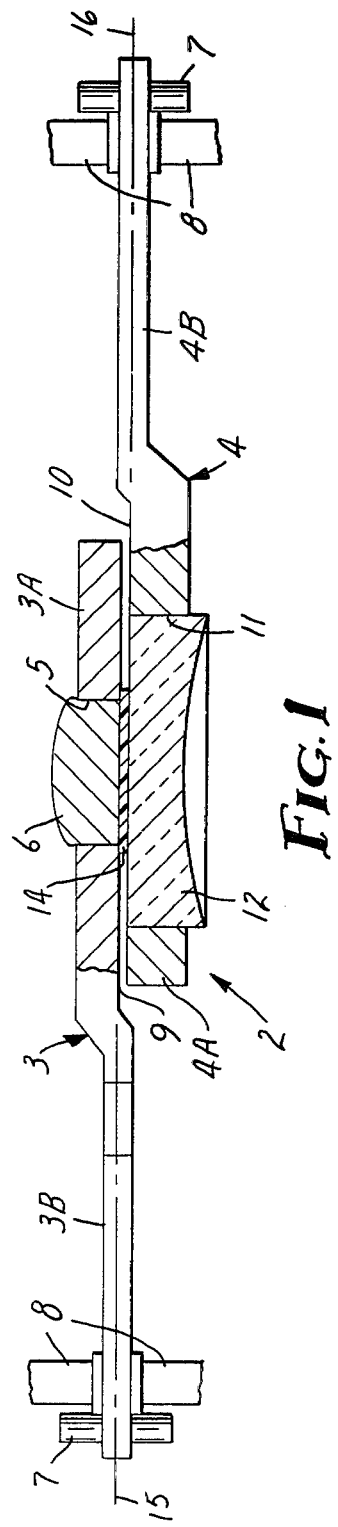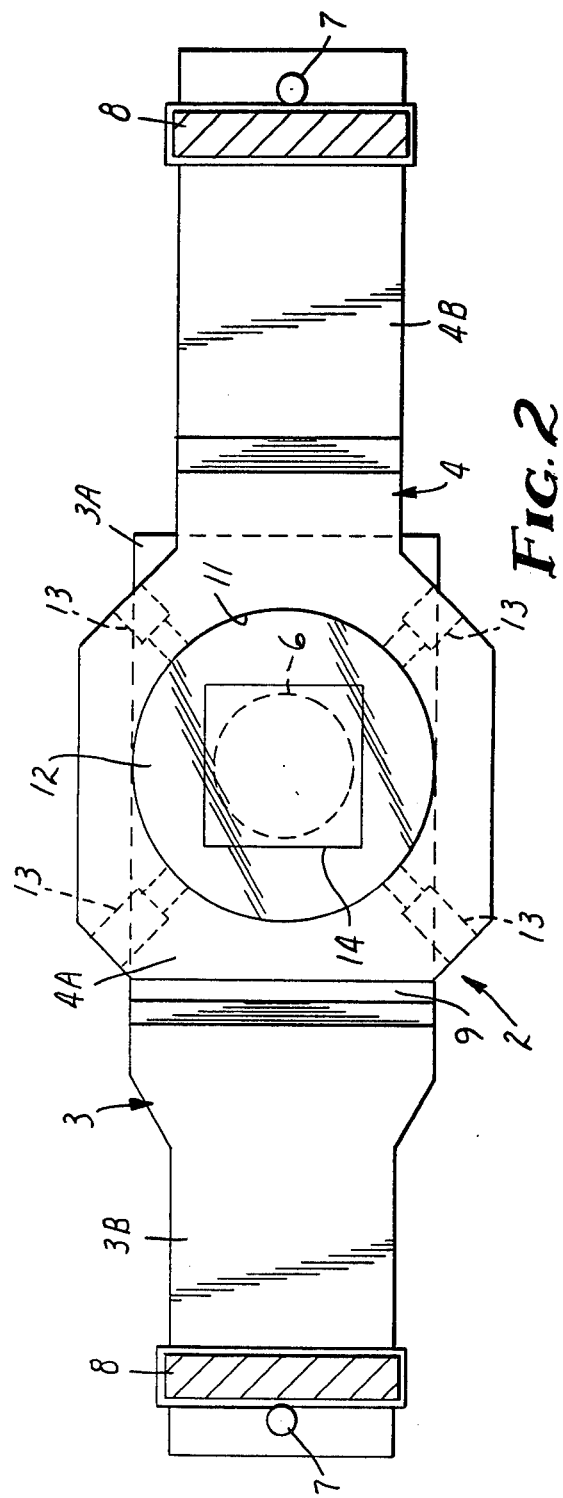

COMFORMABLE, MULTILAYERED TAPE ADHERENT ON ONE SURFACE TO FUSABLE METAL ALLOYS AND ON THE OTHER SURFACE TO OPHTHALMIC LENS BLANKS

CROSS REFERENCE TO RELATED APPLICATION

This is a continuation-in-part of Ser. No. 036,878, filed May 8, 1979, now abandoned.

BACKGROUND OF THE INVENTION

This invention relates to multilayered tapes that have a pressure-sensitive adhesive surface and a separate tack-free adhesion promoting or priming surface. More particularly it relates to conformable, multilayered tapes that are employed to adhere fusible metal alloy to ophthalmic lens blanks. The metal alloy bonds a lens block to the ophthalmic lens blank for use during surfacing (i.e., grinding, fining and polishing) and edging operations.

The term "pressure-sensitive adhesive", as it is used herein, means a compound or composition that is dry (solvent free), aggressively and permanently tacky at room temperature, and firmly adheres to a substrate upon mere contact without the need of application of more than finger or hand pressure. The term "priming surface" means a surface that contains a material that improves or increases the bond between two surfaces.

In making finished ophthalmic lenses, particularly prescription lenses for eyeglasses, it is customary to begin with semi-finished lens blanks made from glass or plastic. The blanks have a finished, polished front surface and an unfinished back surface. They are surfaced to a particular prescription by grinding material from the unfinished back surface followed by fining and polishing so that they acquire the optical refractive properties specified in the prescription. The lenses may then be shaped or edged to fit the spectacle frame selected by the wearer.

It is essential that a lens be positioned accurately and held securely during the surfacing and edging operations. However, edge clamping techniques, such as mounting the lens in a vise or in the jaws of a chuck, are unsuitable for holding the lens because material is removed from both its back surface and edges. Thus, it is necessary that the lens be held by an adhesive means which secures it by the finished surface in the appropriate position in the grinding machine. This may be accomplished by "blocking" the lens, e.g., adhering a lens block to the lens by means of a fusible metal alloy.

The alloy is applied in a molten state and subsequently allowed to harden to form a rigid layer of predetermined size and shape that bonds the lens to the lens block. While the alloy conforms well to the front surface of the lens blank, the strength of the bond between the alloy and the lens blank is low. Consequently, primers are needed to obtain adequate bonding between alloy and lens. Primers, however, cause certain problems. For example, they are typically applied from a solution by, for example, brushing or spraying. Consequently the solvent must be allowed to evaporate before the surfacing and edging processes can proceed. This causes inconvenience and delay in processing the lens blanks.

Other techniques of blocking lens blanks have also been tried. Thus, sticky substances, such as pitch or wax, double-sided sticky constructions such as pads or foams coated on each face with adhesive, and epoxy adhesives have been used. These means also have not proven entirely satisfactory. For example, the residue left by pitch, wax, and adhesives require extensive clean-up of both lens and block. This causes delay and added expense in the processing operations. Additionally these techniques provide less rigid mounting means than do the alloy bonded blocks. Consequently, it is more difficult to assure that the lens will be properly positioned throughout the entire surfacing and edging processes.

Additionally, pads or foams are typically opaque so that it is difficult to properly align the lens in the surfacing or edging apparatus. Additionally, the pads and foams are not satisfactorily conformable to the complex curvature of a lens face. Thus wrinkles, folds, air bubbles and other discontinuities between the lens blank and the pad or form are present when they are employed.

The present invention, however, overcomes these disadvantages. It provides a multilayered tape construction which firmly bonds the fusible metal alloy to the lens blanks. The tapes are conformable, that is, they follow the curvature of the lens blanks without any wrinkles or air bubbles. Moreover the tapes are preferably translucent, that is, they permit light to pass therethrough. As a result, the lens may be visually aligned in the appropriate device prior to blocking. Still further, when tapes of the present invention are removed from the lens they leave virtually no adhesive residue. Thus, messy and time consuming cleaning operations need not be performed on the lens before it can be used. Additionally, the preferred tapes of the invention do not leave any residue on the metal alloy when removed therefrom. Thus, no cleaning is required on the alloy before it can be recycled.

Despite this clean removability, the tapes of the present invention exhibit excellent adhesion to both the lens blank and the alloy. Additionally, the tapes of the invention are able to withstand the shear forces encountered during the surfacing and edging operations. As a result, lenses are held in accurate position throughout these operations.

An added benefit offered by the tape of the present invention is the protection provided to the lenses from thermal and mechanical shock. Thermal protection is particularly important because, in the case of plastic lenses, it is possible for heat distortion to occur in the lens blank when the molten fusible metal alloy makes contact with it. In the completed lens, this distortion will cause abberations from the desired prescription in those areas where it occurred. However, when tapes of the present invention are employed, they offer a significant degree of protection from such distortion.

DISCLOSURE OF INVENTION

In accordance with the present invention there is provided a conformable, multilayered tape for bonding a fusible metal alloy to an ophthalmic lens blank which comprises a polymeric backing layer, a pressure sensitive adhesive on one major surface of the backing layer, and a tack-free adhesion promoting (sometimes referred to as a primer) layer on the other major surface of the backing, wherein the tape has a 2% secant modulus in the range of about 35 kg/cm² to 20,000 kg/cm², a shear value of at least about 10 minutes, a 180° peel value in the range of about 60–1400 g/cm width, an elongation at break in the range of about 45% to 1000% and a lap shear value of at least about 5 kg/cm².

Also provided herein is a method of adhering a fusible metal alloy to an ophthalmic lens blank. This method comprises applying a section of the tape described above to an ophthalmic lens so that the pressure sensitive adhesive of the tape contacts the lens, conforming the tape to the compound surface of the lens so that a surface is provided that is free from wrinkles, air bubbles and other discontinuities in the bond between the tape and the lens blank, and attaching a fusible metal alloy to at least a portion of the primer layer.

The tapes of the invention may be used on both plastic and glass lens blanks. The blanks may vary in curvature from plano to 10-base curve or higher. It is, of course, understood that the particular tape employed may be selected to suit the particular lens to be altered. Preferably, more conformable tapes are employed with lens blanks having a higher base curvature.

BRIEF DESCRIPTION OF DRAWINGS

The lap shear value is determined according to the procedure described hereinafter by utilizing the apparatus illustrated in the accompanying drawings wherein like reference characters refer to the same elements throughout the views and wherein:

FIG. 1 is a side view of the testing jig used to measure the lap shear value; and FIG. 2 is a top view of the testing jig used to measure lap shear value.

DETAILED DESCRIPTION

The unique ability of the tape of the present invention to conform to, that is replicate, the contour of the lens blank while withstanding the shear forces encountered during the surfacing and edging steps is due to the combination of the physical properties set forth above. Preferably the tape of the invention is translucent; and has a 2% secant modulus in the range of about 350 to 2000 kg/cm² most preferably 700 to 1400 kg/cm²); a shear value of at least about 500 minutes; a 180° peel value in the range of about 150 to 750 g/cm width (most preferably 250 to 600 g/cm width); an elongation at break in the range of about 300 to 800% (most preferably 400 to 600%); and a lap shear value of at least about 9 kg/cm² (most preferably one in the range of about 10–18 kg/cm²). In the most preferred embodiments of the present invention, the tapes possess a tensile strength at 100% elongation in the range of about 0.2 to 4 kg/cm, preferably in the range of about 0.5 to 1.5 kg/cm and most preferably in the range of about 0.8 to 1.2 kg/cm.

The 2% secant modulus, % elongation at break, and tensile strength at 100% elongation are measured according to ASTM D-882-A. The 180° peel strength is measured according to ASTM D-1000-76. The shear value, also known as the holding power of pressure-sensitive tapes, is measured according to ASTM D-3654-78. The lap shear value is determined according to the test described below.

The pressure sensitive adhesive side of the tape of the invention is joined to the ophthalmic lens while the primer layer is joined to the metal alloy. The primer layer is non-tacky to the touch. Additionally, lens blanks which have had the tape applied thereto are easy to handle.

The backing layer of the tape must exhibit conformability when the tape is applied to compound lens surfaces (i.e., it must assume the shape of the surface without wrinkles or air bubbles). Additionally, it must exhibit sufficient strength to withstand breaking when applied to the compound surfaces. The thickness of the backing layer is in the range of about 25 to 200 microns thick.

A variety of materials are useful as the backing layer. Examples of useful materials include polyolefinic films (e.g., low and medium density polyethylene, chlorinated polyethylene, copolymers of ethylene with vinyl acetate and ethyl acrylate, oriented and unoriented polypropylene); polyvinyl films, preferably plasticized, (e.g., polyvinyl chloride, copolymers of vinyl chloride with vinyl acetate and vinyl alcohol, polyvinylidene chloride; polyurethane films (e.g., polyester urethane and polyether urethane); polyester films (.e.g., poly-(ethylene terephthalate)); cellulosic films (e.g., cellulose acetate); and polyamide films (e.g., nylon). Laminated constructions of two or more of these materials may be employed as the backing layer if desired.

Specific examples of useful polyolefinic films include those prepared from the DFD series of low and medium density polyethylenes (e.g., maximum density of about 0.94 g/cm³) available from Union Carbide Company. These include DFD 4140 (density of 0.917 g/cm³, a melt index of 2 g/10 min at 190° C.). Still other examples of useful polyolefinic films include oriented polypropylene film available from Sumitomo Shoji as Toyobo Pylen FILM P 2258 (tensile strength of 13.5 kg/mm², tensile elongation 150%); and those prepared from chlorinated polyethylenes, available from Dow Chemical Company, such as CM 0548 (specific gravity of 1.32, 48% chlorine content by weight).

The pressure-sensitive adhesives employed in the present invention exhibit high bond strength to the ophthalmic lens (e.g., plastic and glass). They also exhibit high cohesive strength and high bond strength to the backing layer. Preferably they leave virtually no adhesive residue when removed from the lens.

The amount of adhesive present on the backing layer should be sufficient to hold the tape on the lens during the surfacing and generating process. It has been found preferable that the amount of adhesive present be in the range of about 7 g/m² to 80 g/m². More preferably the amount of adhesive present is in the range of about 15 g/m² to 80 g/m². More preferably the amount of adhesive present is in the range of about 15 g/m² to 45 g/m². Most preferably it is in the range of about 19 g/m² to 35 g/m².

A variety of adhesives are useful as the pressure-sensitive adhesive. They include polyacrylate adhesives, natural rubber adhesives, and thermoplastic rubber adhesives. Preferably the adhesive is a polyacrylate adhesive.

A particularly useful polyacrylate pressure-sensitive adhesive comprises a polymer of an acrylate ester of acrylic acid with a non-tertiary alcohol. These adhesives also preferably contain a minor amount of a copolymerized acid or amide. These adhesives and methods of their preparation are known. Thus see U.S. Pat. No. Re. 24,906. An example of a useful pressure-sensitive adhesive of this type comprises a polymer of 90 parts by weight isooctyl acrylate and 10 parts by weight acrylic acid available as Y 9460 from 3M Company.

The polyacrylate pressure-sensitive adhesives may be crosslinked if desired. Techniques for accomplishing this are known and described, for example, in U.S. Pat. No. 2,925,174.

Useful natural rubber adhesives comprise natural rubber and, preferably, a tackifying resin. One such adhesive comprises natural pale crepe rubber (100 parts by weight), polyterpene resin (75 parts by weight), and antioxidant (1 part by weight). However, other useful natural rubber adhesives are also useful and will be apparent to those skilled in the art.

Useful thermoplastic rubbery adhesives comprise a rubbery block copolymer and, preferably, at least one resin compatible with the block copolymer. The rubbery copolymers have the general configuration A-B-A wherein the A units represent a thermoplastic polymer block with a $T_g$ above 20° C. and the B units represent an elastomeric polymer block formed from a conjugated diene. The A units are relatively incompatible with the B units and have an average molecular weight of from about 5,000 to 125,000. Preferably the A units are styrene and the B units are polybutadiene or polyisoprene. An example of block copolymer of this type is Shell Chemical Company Kraton 1101, a block copolymer of styrene and butadiene having one butadiene central block of 70,000 molecular weight and two terminal blocks of styrene of 15,000 molecular weight each. Other block copolymers of this type may also be used.

Resins compatible with the block copolymer are known and include, for example, hydrocarbon resins, coumarone-indene resins, dimerized rosins, metal resinates, hydrogenated rosins, poly-terpene resins and heat treated wood rosins. Still other resins are also useful and will be obvious to those skilled in the art.

The material utilized as the primer layer in the present invention must increase the strength of the bond between the alloy and the lens blank so as to provide a bond of sufficient strength to the fusible metal alloy to withstand the stresses imposed during surfacing and edging. Despite this requirement, however, the tape of the invention must be readily removable (e.g., by impact removal, peeling, scraping, dissolving, etc.) from the alloy after removal.

Additionally, it is preferred that the primer layer have a modulus that is similar to that of the backing layer. Most preferably the moduli of the primer and backing layers are substantially identical. Similarity in the moduli enables both the primer and backing layers to stretch and conform to the complex surfaces of lenses without separating from one another.

A variety of materials are useful as the primer layers. They include urethane polymers, vinyl polymers and copolymers (particularly plasticized vinyl polymers and copolymers) and synthetic rubbers. Combinations of these materials may also be employed as the primer layer. Thus, for example, one may combine urethane and vinyl polymers in the primer layer.

It has been found that combinations of materials, such as combinations of urethane polymers with one or more of the vinyl polymers, form excellent primer layers for tapes used when blocking is accomplished with higher melting (e.g., 70° C.) alloys. Such primer layers provide particularly good impact removal characteristics from the lens. Preferably the combinations of materials comprise from about 60 to 90 parts by weight of the urethane and, correspondingly, from about 40 to 10 parts by weight of the vinyl.

The useful urethane polymers (e.g., those prepared by reacting an isocyanate and a polyol) are preferably essentially completely reacted thermoplastic polymers and are either polyester or polyether based. Representative examples of useful urethane polymers include the Estane ® series of polymers available from the B. F. Goodrich Chemical Company. Included among these polymers are Estane ® 5702-F2 (, a polyester urethane, Brookfield RVF solution viscosity at 25° C. and 20% solids in methyl ethyl ketone of 800–1200 cps); Estane ® 5711 (a highly crosslinked polyester urethane, Brookfield RVF solution viscosity at 25° C. and 20% solids in methyl ethyl ketone of 1800–3000 cps); Estane ® 5714-F1 (a polyether urethane, Brookfield RVF solution viscosity at 25° C. and 15% solids in tetrahydrofuran of 600–1200 cps); and Estane ® 5715 (a polyester urethane Brookfield RVF solution viscosity at 25° C. and 20% solids in methyl ethyl ketone of 100–200 cps).

Yet another polyurethane useful in the primer layer comprises a high-molecular weight polyester polyurethane polymer synthesized from neopentyl glycol, polyepsiloncaprolactone diol and p,p'-diphenylmethane diisocyanate using processing techniques known in the art. Techniques for the preparation of these urethanes may be found, for example, in Encyclopedia of Chemical Technology, 2d Ed., Vol. 21 (1970), pp 67–75, and Encyclopedia of Polymer Science and Technology, Vol. II. (1969) pp. 516–526.

The vinyl polymers useful as the primer layer may be the same vinyl polymers utilized as the backing layer. However, they are applied as a distinct layer on the backing layer. Representative examples of useful vinyl polymers include polyvinyl chloride, polyvinyl acetate, polyvinylidene chloride and copolymers of vinyl chloride with vinyl acetate, vinyl alcohol, and vinylidene chloride, and copolymers of vinyl acetate and vinyl alcohol. Other useful vinyl polymers are the polyacrylates, polymethacrylates and the various copolymers thereof. Representative examples of useful vinyl polymers of this type include poly(ethyl acrylate), poly(methyl acrylate), poly(methyl methacrylate). Copolymers of ethyl acrylate and methacrylate with each other and with monomers are also useful.

Specific examples of useful vinyl polymers include the Bakelite ® vinyl resins available from Union Carbide Company such as MA-28-18 (82% vinyl acetate, 18% vinyl alcohol by weight), VYHH (86% vinyl chloride, 14% vinyl acetate by weight), VAGH (91% vinyl chloride, 83% vinyl acetate, 6% vinyl alcohol by weight) and VYNC (58% vinyl chloride, 34% vinyl acetate by weight). Other useful vinyl resins include polyvinylidene chloride and copolymers of vinylidene chloride such as Saran ® F-310 (copolymer of vinylidene chloride with vinyl chloride) available from Dow Chemical Company.

Other materials useful as the primer layer include bisphenol A epoxy resins (e.g., "Epon 1004" available from Shell Chemical Company), cellulose acetate butyrate resins (e.g., the film grade cellulose acetate butyrates available from Eastman Chemical Company), rubbery block copolymer materials (e.g., Kraton 1101 available from Shell Chemical Company), and synthetic rubber compositions (e.g., nitrile rubber compositions such as EC-1099 available from 3M Company).

The primer layers of the present invention may contain a variety of additional ingredients. Thus, they may be modified by the incorporation of modifying agents that increase flexibility, fillers, antiblocking agents, and the like.

The modifying, or flexibilizing agents, are particularly useful when vinyl polymers are employed in the primer layer. Preferably sufficient modifying material is added to adjust the 2% secant modulus close to that of the backing layer. Representative examples of useful modifying agents include dioctyl phthalate, dibutyl phthalate, tricresyl phosphate, toluene-sulfonamide, etc. Other materials of this nature will be obvious as a result of this disclosure. Yet other useful modifying materials are the polycaprolactone polymers such as PCL-700 from Union Carbide Company. This polymer is a crystalline, thermoplastic resin having a crystalline melting point of about 60° C.

Fillers and antiblocking agents are useful in reducing blocking to other surfaces. Materials useful as fillers and antiblocking agents are well known in the art.

Although the amount of the material employed in the primer layer may be varied, it is preferred that the layer have a dried weight in the range of about 1 g/m$^2$ to 10 g/m$^2$, preferably in the range of about 2 g/m$^2$ to 6 g/m$^2$, and most preferably in the range of about 2.5 g/m$^2$ to 5 g/m$^2$.

Other layers and ingredients may be employed in the tapes of the present invention. For example, an anchoring layer may be employed between the backing layer and the pressure-sensitive adhesive in order to improve the bond therebetween. The anchoring layer can be selected from a variety of materials commonly employed for improving bonds between substrates.

A particularly useful anchoring layer comprises a water-soluble rubbery polymer, alkaline in aqueous solution, consisting essentially of the reaction product of an epoxidized water-insoluble neutral rubbery polymer selected from the class consisting of cis-1,4-polybutadiene, butadiene:styrene copolymer, butadiene:acrylonitrile copolymer and cis-1,4-polyisoprene and a water-soluble secondary mono amine. These polymers are described in U.S. Pat. No. 3,661,874 incorporated herein by reference.

Typically, the anchoring layer is applied to the backing layer from a water or methanol solution. The solvent is then removed from the coating by, for example, heating at 50° C. or more for a short period of time (e.g., one minute).

Other materials are also useful as the anchoring layer and will be obvious to those skilled in the art. Included among such materials are polydimeryl polyamine materials such as those available from General Mills Company.

Other anchoring techniques may also be employed. Thus, for example, backing layers may be corona treated prior to application of the pressure-sensitive adhesive thereto.

It has been found that colorants are useful in the tapes of the present invention to enhance the visibility of the tapes once they have been applied to the ophthalmic lens blanks. Preferably they do not render the tapes opaque. Typically, they are included in the backing layer. This is done for convenience sake only as they may also be included within either the primer layer or the pressure-sensitive adhesive. Typically they comprise up to about 10% by weight of whatever layer they are in. The colorants are preferably pigments that are added as suspensions in a solvent compatible with the coating solution used for the primer layer. A particularly useful pigment and concentration is copper phthalocyanine present in an amount in the range of 2 to 7 parts by weight.

The tape of the present invention is readily prepared from known processing techniques. Thus, for example, the pressure-sensitive adhesive may be applied by solution coating the appropriate adhesive onto the backing layer followed by removal of the solvent therefrom. Alternatively, the adhesive may be applied by first solution coating it onto a liner followed by removal of the solvent therefrom. The dried adhesive may then be nip laminated to the backing layer.

The primer layer may be applied by similar coating techniques. Thus, for example, it may be solution coated onto the side of the backing layer opposite the adhesive, followed by removal of the solvent therefrom. It is preferred that a liner be employed over the adhesive to prevent the backing and adhesive construction from sticking to the processing equipment employed or to the tape when wound after manufacture.

The tapes of the present invention are easily applied to ophthalmic lens blanks. Thus, the pressure-sensitive adhesive portion of the tapes of the present invention are applied to the front, or finished, surface of a lens blank. This may be done either by hand or, preferably, by means of a mechanical device such as is described in co-pending application Ser. No. 037,301, filed May 8, 1979. In either event, the tape of the present invention conforms readily to the configuration of the lens blank without wrinkles, folds, air bubbles, or other discontinuities between the adhesive and the front surface of the lens. Preferably, the tape of the invention is applied so that it covers the entire front surface or back surface of the lens. Normally it is applied to the front surface.

After application, excess tape is trimmed away from the periphery of the lens blank. The lens blank is then blocked. This may be accomplished by means of conventional blocking techniques using devices developed for this purpose. Representative examples of blocking devices are the Optek Blocker available from the Optek Division of Associated Development Corporation, and the Coburn Blocker available from the Coburn Company. In each of these devices, a molten fusible metal alloy is injected in a cavity provided between the taped lens and the block.

After the alloy has solidified and cooled, the blocked lens is removed from the blocking machine and is ready for mounting in the surfacing and/or edging machines. When these operations have been completed, the finished lens is deblocked, for example, by means of a sharp tap. This may be easily accomplished with the aid of a hollow cylinder that is adapted to support the finished lens on its wall while receiving the still attached lens blank within its hollow portion. By holding the lens and cylinder together and striking the bottom of the cylinder upon a hard surface, the bond between the alloy and the tape may be broken.

The lenses may also be deblocked by melting the alloy by, for example, in hot water. In either event, the tape is then removed from the lens and discarded. The lens and block may then, if necessary, be cleaned.

The test method employed to determine lap shear value will now be discussed with reference to FIGS. 1 and 2. FIGS. 1 and 2 show a side view and a top view (both partially broken away) of the testing jig 2 employed in the test procedure. Jig 2 comprises two offset holders 3 and 4.

Holder 3 has flat portions 3A and 3B which are offset from one another in a step-like manner. Portion 3A has a planar surface 9 and a circular opening 5 therethrough. Portion 3A is offset from portion 3B so that the centerline 15 of portion 3A is along the plane of surface 9. Opening 5 receives a quantity of fusible metal alloy 6. For purposes of this device and the lap shear test, opening 5 has a diameter of about 0.875 in (2.225 cm). The thickness of portion 3A is not critical to the test. It is conveniently about 0.25 in (0.635 cm) thick.

Portion 3B has a pin 7 through it. This pin serves as a point against which jaws 8 of an Instron testing machine (not shown) may pull.

Holder 4 has flat portions 4A and 4B which are offset from one another in a step-like manner. Portion 4A has a planar surface 10 and a circular opening 11 therethrough which receives a plano lens 12. Portion 4A is offset from portion 4B so that the centerline 16 of portion 4A is along the plane of surface 10. For purposes of this device and the lap shear test, opening 11 has a diameter of about 2 in (5.08 cm). The thickness of portion 4A is not critical to the test. It is conveniently about 0.375 in (0.953 cm) thick. Portion 4B also has a pin 7 through it which serves as a point against which jaws 8 of an Instron testing machine may pull.

Portion 4B further has clamping means 13 which hold lens 12 in opening 11. In the embodiment shown, the clamping means comprise set-screws, although other clamping means may also be employed.

In order to test the lap shear value of a tape, a glass lens 12 is clamped into opening 11 of holder 4 such that a planar surface of the lens is in the same plane as that of surface 10. A section of tape is then applied to the center point of the planar surface of lens 12. Sufficient tape is applied so that it is larger in length and width than the diameter of opening 5.

Holder 3 is then placed over holder 4 so that surface 9 contacts the primer layer of tape 14, and so that the geometric axis of opening 5 is in registry with the geometric axis of opening 11 and lens 12. Sufficient molten metal alloy 6 which has a melting point of 70° C. is placed in the cavity defined by opening 5 and tape 14 to fill said cavity. The alloy is allowed to solidify.

The lap shear value of the tape is then determined by placing the ends of assembled jig 2 in the jaws 8 of the Instron testing device and pulling the ends of the jig away from each other at a rate of 0.25 in/min (6.4 mm/min). The force required to break the bond between the alloy and the tape is recorded and the lap shear value is determined from the formula Lap Shear $(kg/cm^2) = F/A$ where F is the force (in kg) required to break the bond and A is the area (in $cm^2$) of contact between the alloy and the tape.

The present invention is further exemplified in the following examples. In these examples, all amounts are parts by weight unless otherwise noted.

EXAMPLE 1 AND EXAMPLES 2–19

Example 1

A lens primer tape according to the present invention was prepared from a backing layer of low density polyethylene, an adhesive layer of pressure-sensitive adhesive on one side thereof and a primer layer of polyester polyurethane on the other side thereof.

The backing layer comprised an unmodified polyethylene (DFD-4140, density of 0.917 g/cm³, melt index of 2.0 g/min @190° C. available from Union Carbide Corporation) which had been extruded to a film of about 120 microns thickness. Both sides of the resultant film were corona treated.

An anchoring layer was applied to one side of the backing layer from a 0.1% by weight solution of a water-soluble polymer in methanol and dried at 65° C. for 1 minute. The layer was prepared by providing a 9.3% by weight solution of cis-1,4-polybutadiene rubber (241.5 g Ameripol CB 220, Goodrich-Gulf Chemical Company) in toluene; epoxidizing the polybutadiene to an epoxy equivalent weight of 131 by admixture with 4.1 g of formic acid and slow addition of 35% hydrogen peroxide at 63° C.; and then aminizing the epoxidized polybutadiene to a water-soluble polymer by heating to 67° C. and adding 125 grams of a 24% by weight solution of dimethylamine in methanol over about a 1 hour period. A creamy yellow emulsion resulted which was stirred and kept at 67° C. until a small, dried sample of the polymer could be dissolved in water. Methanol was then added to the solution and the solvents removed by vacuum stripping. Vacuum stripping was continued until a clear amber solution with a solids content of about 35% resulted. The solution was then diluted to the desired level by the addition of methanol.

The pressure-sensitive adhesive of the adhesive layer comprised a crosslinked copolymer of 90 parts by weight isooctylacrylate and 10 parts by weight acrylic acid similar to those described in U.S. Pat. No. 2,925,174. The adhesive was solution coated onto a liner and dried at 75° C. for 15 minutes to provide a dried coating weight of 30.6 g/cm². The adhesive was then nip laminated to the anchoring layer.

The primer layer was a polyester urethane polymer synthesized from neopentyl glycol, poly-epsilon-caprolactone diol, and p,p'-diphenylmethane diisocyanate. It was solution coated onto the opposite side of the backing layer, air dried for 10 minutes then dried at 65° C. for 1 minute. The primer layer of the resultant lens primer tape was tack-free to the touch.

The primer tape was applied to the convex surfaces of a separate 4-base curve lens blanks made from polydiallylglycolcarbonate and glass with the adhesive layer of the tape contacting the lenses. The tape conformed and adhered well to the compound surface in a wrinkle-free fashion. Additionally no air bubbles were present in the film. The lenses were then blocked. The blocks could be readily removed by impact deblocking in the case of the plastic lens and by the hot water technique in the case of the glass lens.

The tape was then tested for lap shear value according to the technique described above. The lap shear value was 21.1 kg/cm². When the lap shear was tested using 47° C. melting alloy in place of 70° C. melting alloy, the value was 14.6 kg/cm².

EXAMPLES 2–19

Lens primer tapes according to the invention were prepared as described in Example 1 except that different materials were used as the primer layers. The tape constructions and their lap shear values are reported in Tables 1 and 2.

The tapes conformed well to compound (i.e., convex) surfaces of glass and plastic lens blanks in a wrinkle and air bubble free manner. Lens blocks joined to lens blanks by means of the tapes of these examples and 70° C. melt point alloy could be readily deblocked by either impact deblocking or hot water deblocking.

EXAMPLES 33-35

Lens primer tapes according to the invention were prepared as described in Example 1 except that different backing layers were utilized. The resultant tapes were translucent and blue in color. The primer layers of all of the tapes were tack-free to the touch. When they were applied to 4-base curve lens blanks of polydiallylglycolcarbonate as described in Example 1, the tapes conformed well to the compound surface in a wrinkle-free manner. The tapes were then employed between the lens blank and 47° C. fusible metal alloy.

The tapes were tested for 2% secant modulus and % elongation at break. The results of the tests, together with the materials used as the backing layers are set forth in Table 4.

TABLE 1

|  | 2 | 3 | 4 | 5 | 6 | 7 | 8 | 9 | 10 | 11 | 12 | 13 |
|---|---|---|---|---|---|---|---|---|---|---|---|---|
| Polyester urethane of Ex. 1 | 90 | 80 | 70 | 60 |  |  |  |  | 80 | 70 | 60 | 50 |
| VYHH | 10 | 20 | 30 | 40 | 10 | 20 | 30 | 40 | 10 | 20 | 30 | 40 |
| Estane ® 5715 |  |  |  |  | 90 | 80 | 70 | 60 |  |  |  |  |
| PCL 700 |  |  |  |  |  |  |  |  | 10 | 10 | 20 | 20 |
| Lap Shear Value (kg/cm²) | 17.8 | 14.5 | 14.7 | 8.4 | 13.6 | 6 | 4.7 | 6.7 | 14.2 | 14.9 | 10.4 | 20.7 |

TABLE 2

|  | 14 | 15 | 16 | 17 | 18 | 19 |
|---|---|---|---|---|---|---|
| Polyester urethane of Ex. 1 | 80 | 80 | 80 | 80 | 80 | 80 |
| Polymethyl methacrylate | 20 |  |  |  |  |  |
| Polystyrene |  | 20 |  |  |  |  |
| "Epon 1004" |  |  | 20 |  |  |  |
| Cellulose Acetate Butyrate |  |  |  | 20 |  |  |
| Kraton 1101 |  |  |  |  | 20 |  |
| MA 28-18 |  |  |  |  |  | 20 |
| Lap Shear Value (kg/cm²) | 11 | 18.8 | 20.7 | 16.6 | 20.8 | 15.1 |

EXAMPLES 20-32

Lens primer tapes according to the invention were prepared as described in Example 1 except that different materials were used as the primer layers. The coating solutions employed to apply the primer layers for each resulting tape are set forth in Table 3.

TABLE 3

|  | 20 | 21 | 22 | 23 | 24 | 25 | 26 | 27 | 28 | 29 | 30 | 31 | 32 |
|---|---|---|---|---|---|---|---|---|---|---|---|---|---|
| Estane ® 5702-F2 |  | 9.6 | 0.4 |  |  |  |  |  |  |  |  |  |  |
| Estane ® 5714 |  |  | 9.2 |  |  |  |  |  |  |  |  |  |  |
| Estane ® 5711 |  |  |  | 9.6 |  |  |  |  |  |  |  |  |  |
| Estane ® 5715 | 9.6 |  |  |  |  |  |  |  |  |  |  | 4.35 |  |
| VYNC |  |  |  |  | 84.9 |  |  |  |  |  |  |  | 46.6 |
| MA28-18 |  |  |  |  |  | 50 |  |  |  |  |  |  |  |
| VYHH |  |  |  |  | 0.3 |  | 20 |  |  |  |  |  |  |
| VAGH |  |  |  |  |  |  |  | 20 |  |  |  |  |  |
| SARAN ® F-310 |  |  |  |  |  |  |  |  | 20 |  |  |  |  |
| Nitrile Adhesive[a] |  |  |  |  |  |  |  |  |  | 50 |  |  |  |
| Polyurethane Adhesive[b] |  |  |  |  |  |  |  |  |  |  | 50 |  |  |
| Dioctyl Phthalate |  |  |  |  |  |  |  |  |  |  |  |  | 4.7 |
| PCL 700 |  |  |  |  |  |  |  |  |  |  |  | 2.28 |  |
| Copper phthalocyanine | 0.4 | 0.4 | 0.4 | 0.4 | 0.3 |  |  |  |  |  |  | .18 |  |
| Methyl ethyl ketone | 56.7 | 56.7 | 3.2 | 30 | 2 | 20 | 80 | 80 | 80 | 50 | 50 | 26 |  |
| Tetrahydrofuran |  |  | 53.5 |  |  |  |  |  |  |  |  |  |  |
| CH₂Cl₂ |  |  |  |  |  |  |  |  |  |  |  |  | 6.8 |
| Acetone |  |  |  | 26.7 |  |  |  |  |  |  |  |  |  |

[a]Available as EC-1099 from Minnesota Mining and Manufacturing Company
[b]Available as EC-4475 from Minnesota Mining and Manufacturing Company The resultant lens primer tapes were translucent. Those of Examples 20-24 and 31 were blue. Those of Examples 25-30 and 32 were white. The primer layers of all the tapes were tack-free to the touch. When the tapes were applied to 4-base curve lens blanks of polydiallylglycolcarbonate and glass as described in Example 1, they conformed well to the compound surface a wrinkle-free and air bubble-free manner. After blocking, the lens blocks could be easily removed by either impact deblocking or hot water deblocking.

The tape of Example 20 had a lap shear value of 20.6 kg/cm². Additionally it had a 2% secant modulus of 952 kg/cm² and an elongation at break of 513%. The initial grip separation and rate of grip separation were 2.5 cm and 25 cm/min. respectively. The tape of Example 28 had a lap shear value of 16 kg/cm².

TABLE 4

| Example | Backing | 2% Secant Modulus (kg/cm²) | Elongation @ Break (%) |
|---|---|---|---|
| 33 | Chlorinated Polyethylene 175 Micron Thick | 38.2 | 363 |
| 34 | Biaxially Oriented Polypropylene 51 Micron Thick | 14,413 | 232 |
| 35 | Cellulose Acetate 43 Micron Thick | 19,025 | 49 |

Grip Separation: Ex. 33 = 2.5 cm; Ex. 34 = 5 cm; Ex. 35 = 12.5 cm
Rate of Separation: Ex. 33 and 34 = 25 cm/min; Ex. 35 = 12.5

EXAMPLES 36-37

Example 1 was repeated except that different materials were employed as the pressure-sensitive adhesive. The adhesive formulations were Formulation A                                                        pts by wgt.

-continued

| | |
|---|---|
| Kraton 1101 | 100 |
| Polyterpene resin | |
| (Piccolyte A 135 from | |
| Pennsylvania Industrial | |
| Corporation) | 76 |
| Toluene | 100 |
| Hindered phenolic resin | |
| (A-330 from Ethyl Corporation) | 0.875 |

| Formulation B | pts by wgt. |
|---|---|
| Pale crepe natural rubber | 100 |
| Polyterpene resin (Zonarez | |
| B 115 from Arizona Chemical | |
| Company) | 75 |
| 2,5-di-tertiary amyl hydro | |
| quinone (Santovar A from | |
| Monsanto Chemical Company) | 1 |
| Heptane | 750 |

The resulting tapes were translucent and blue in color. The primer layers were tack free to the touch. The tapes were applied to the convex surfaces of 4-base curve lens blanks of pollydiallylglycolcarbonate as described in Example 1. The tapes conformed well and adhered well to the compound surfaces in a wrinkle-free and air-bubble free fashion. Conventional techniques were then employed to apply lens blocks to the primer layer of the tapes with 47° C. melt point alloy.

What is claimed is:

1. A conformable, multilayered tape for bonding fusible metal alloy to an opthalmic lens blank which comprises
    a polymer backing layer,
    a pressure sensitive adhesive on one major surface of said backing layer, and
    a tack-free adhesion-promoting layer on the other major surface of said backing,
    wherein, when said tape is interposed between an ophthalmic lens blank and a fusible metal alloy so that said adhesive contacts said lens blank and said adhesion-promoting layer contacts said fusible metal alloy, the bond strength between said alloy and said lens blank is greater than the bond strength between said alloy and said lens blank if said tape were not present; and
    wherein said tape has a 2% secant modulus in the range of about 35 kg/cm$^2$ to 20,000 kg/cm$^2$, a sheer value of at least about 10 minutes, a 180° peel value in the range of about 60 g/cm width to 1400 g/cm width, a percent elongation at break in the range of about 45% to 1,000% and a lap shear value of at least about 5 kg/cm$^2$.

2. A tape according to claim 1 wherein said adhesion-promoting layer is selected from urethane polymers, vinyl polymers, synthetic rubber, and mixtures thereof.

3. A tape according to claim 2 wherein said adhesion-promoting layer is a urethane polymer.

4. A tape according to claim 3 wherein said urethane polymer is selected from polyester urethane polymers and polyether urethane polymers.

5. A tape according to claim 4 wherein said urethane polymer is a polyether urethane.

6. A tape according to claim 4 wherein said urethane polymer is a polyester urethane.

7. A tape according to claim 2 wherein said adhesion-promoting layer is a vinyl polymer.

8. A tape according to claim 7 wherein said vinyl polymer is selected from polyvinyl chloride, polyvinyl acetate, polyvinylidene chloride, copolymers of vinyl chloride with vinyl acetate, vinyl alcohol, and vinylidene chloride, copolymers of vinyl acetate and vinyl alcohol, poly(ethyl acrylate), poly(methyl acrylate), poly(methyl methacrylate) and copolymers of ethyl acrylate and methyl acrylate.

9. A tape according to claim 8 wherein said vinyl polymer is plasticized.

10. A tape according to claim 2 wherein said adhesion-promoting layer is a synthetic rubber.

11. A tape according to claim 10 wherein said synthetic rubber is a nitrile rubber.

12. A tape according to claim 2 wherein said adhesion-promoting layer comprises from about 60 to 90 parts by weight of said urethane polymer and, correspondingly from about 40 to 10 parts by weight of said vinyl polymer.

13. A tape according to claim 12 wherein said urethane is a polyester urethane.

14. A tape according to claim 1 wherein said pressure sensitive adhesive is selected from polyacrylate pressure sensitive adhesives, natural rubber pressure sensitive adhesives and rubbery block copolymer pressure sensitive adhesives.

15. A tape according to claim 14 wherein said pressure sensitive adhesive is a polyacrylate pressure sensitive adhesive.

16. A tape according to claim 15 wherein said polyacrylate pressure sensitive adhesive comprises a polymer of an acrylate ester of acrylic acid with a non-tertiary alcohol.

17. A tape according to claim 16 wherein said pressure sensitive adhesive comprises a polymer comprising 90 parts by weight isoctyl acrylate and 10 parts by weight acrylic acid.

18. A tape according to claim 17 wherein said pressure sensitive adhesive is at least partially crosslinked.

19. A tape according to claim 2 wherein said backing layer is selected from polyolefinic films, polyvinyl films, polyester films, polyurethane films, cellulosic films, and polyamide films.

20. A tape according to claim 19 wherein said backing is a polyolefinic film.

21. A tape according to claim 20 wherein said polyolefinic film is selected from low and medium density polyethylene, chlorinated polyethylene and polypropylene.

22. A tape according to claim 21 wherein said polyolefinic film is selected from low and medium density polyethylene.

23. A tape according to claim 1 having a tensile strength at 100% elongation in the range of about 0.2 to 4 kg/cm.

24. A translucent tape according to claim 1.

25. A method of adhering a fusible metal alloy to a compound surface of an ophthalmic lens blank comprising
    applying the pressure-sensitive adhesive portion of a section of the conformable multilayered tape according to claim 1 to the entirety of a compound surface of an ophthalmic lens blank;
    conforming said tape to said surface so that said tape is free from wrinkles, air bubbles and other discontinuities in the bond between said tape and said lens blank; and
    applying a fusible metal alloy to at least a portion of the adhesion-promoting layer of said tape.

* * * * *